US007522211B2

(12) United States Patent
Lee et al.

(10) Patent No.: US 7,522,211 B2
(45) Date of Patent: Apr. 21, 2009

(54) STUDIO LIGHT

(75) Inventors: Kian Shin Lee, Penang (MY); Janet Bee Yin Chua, Perak (MY); Yue Hoong Lau, Penang (MY); Teoh Teh Seah, Loveland, CO (US); Joon Chok Lee, Sarawak (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 359 days.

(21) Appl. No.: 11/055,739

(22) Filed: Feb. 10, 2005

(65) Prior Publication Data

US 2006/0176692 A1 Aug. 10, 2006

(51) Int. Cl.
*H04N 5/222* (2006.01)

(52) U.S. Cl. .................... 348/370; 348/371; 348/227.1; 315/159; 315/307; 315/362; 362/227; 362/240; 362/231

(58) Field of Classification Search ................ 348/370, 348/371, 223.1, 224.1, 227.1; 362/240, 227, 362/231, 285, 293, 295, 800; 315/156-159, 315/291, 307, 360, 362; 250/226, 211, 205, 250/216, 214 R
See application file for complete search history.

(56) References Cited

U.S. PATENT DOCUMENTS

| | | | | |
|---|---|---|---|---|
| 5,016,046 | A | 5/1991 | Nishiyama | |
| 5,067,049 | A * | 11/1991 | Milaire | 362/18 |
| 5,117,118 | A | 5/1992 | Fukuyama | |
| 5,477,326 | A | 12/1995 | Dosmann | |
| 5,722,755 | A | 3/1998 | Slape | |
| 5,758,942 | A | 6/1998 | Fogal et al. | |
| 5,815,204 | A | 9/1998 | Abe et al. | |
| 5,895,128 | A | 4/1999 | Kishimoto et al. | |
| 5,909,245 | A | 6/1999 | Aoki et al. | |
| 6,277,301 | B1 | 8/2001 | Hohn et al. | |
| 6,344,641 | B1 * | 2/2002 | Blalock et al. | 250/205 |
| 6,379,022 | B1 | 4/2002 | Amerson et al. | |
| 6,448,550 | B1 * | 9/2002 | Nishimura | 250/226 |
| 6,501,091 | B1 | 12/2002 | Bawendi et al. | |
| 6,636,003 | B2 * | 10/2003 | Rahm et al. | 315/179 |
| 6,664,556 | B2 | 12/2003 | Doberenz | |
| 6,781,329 | B2 * | 8/2004 | Mueller et al. | 315/297 |
| 6,803,719 | B1 | 10/2004 | Miller et al. | |
| 6,864,749 | B2 | 3/2005 | Seetharaman et al. | |

(Continued)

FOREIGN PATENT DOCUMENTS

DE 100 31 303 A1 1/2002

(Continued)

OTHER PUBLICATIONS

U.K. Patent Office Search Report dated Jun. 1, 2006 issued by U.K.

(Continued)

*Primary Examiner*—Haissa Philogene

(57) ABSTRACT

A studio light having first and second light output regimes, and adjustable color temperature. The color temperatures of the first and second light output regimes may be different. The light module includes one or more emitters of light of at least two different colors. An external signal causes the light module to switch from a first light output regime to a second, higher intensity light output regime, and back to the first light output regime.

15 Claims, 1 Drawing Sheet

U.S. PATENT DOCUMENTS

| | | | | |
|---|---|---|---|---|
| 6,894,266 | B2 | 5/2005 | Richard et al. | |
| 6,909,377 | B2 | 6/2005 | Eberl | |
| 7,005,667 | B2 | 2/2006 | Chen et al. | |
| 7,102,152 | B2 | 9/2006 | Chua et al. | |
| 7,106,378 | B2 * | 9/2006 | Kawakami | 348/371 |
| 7,178,941 | B2 * | 2/2007 | Roberge et al. | 362/225 |
| 2002/0191102 | A1 | 12/2002 | Yuyama et al. | |
| 2003/0052992 | A1 | 3/2003 | Nakata | |
| 2003/0123873 | A1 | 7/2003 | Okubo | |
| 2003/0127659 | A1 | 7/2003 | Bawendi et al. | |
| 2003/0127660 | A1 | 7/2003 | Bawendi et al. | |
| 2003/0180037 | A1 | 9/2003 | Sommers | |
| 2003/0216151 | A1 | 11/2003 | Kitano et al. | |
| 2004/0245912 | A1 | 12/2004 | Thurk et al. | |
| 2005/0134723 | A1 * | 6/2005 | Lee et al. | 348/370 |
| 2005/0135079 | A1 * | 6/2005 | Yin Chua et al. | 362/12 |
| 2005/0199784 | A1 | 9/2005 | Jaffar et al. | |
| 2006/0002110 | A1 * | 1/2006 | Dowling et al. | 362/252 |

FOREIGN PATENT DOCUMENTS

| | | | |
|---|---|---|---|
| DE | 10055767 | A1 | 8/2002 |
| DE | 102 61 365 | A1 | 7/2004 |
| DE | 102 61 428 | A1 | 7/2004 |
| EP | 1 160 883 | A2 | 12/2001 |
| EP | 1 369 935 | A1 | 12/2003 |
| EP | 1176849 | A2 | 9/2004 |
| GB | 2253718 | A | 9/1992 |
| JP | 2003-7103 | A | 1/2003 |
| JP | 2003-66519 | A | 3/2003 |
| JP | 2003-215675 | A | 7/2003 |
| JP | 2005011628 | A | 1/2005 |
| JP | 2006025167 | A | 1/2006 |
| WO | WO 2004/060024 | A | 7/2004 |

OTHER PUBLICATIONS

German Office Action dated Mar. 28, 2006 involving German Application No. 10 2005 045 106.3-33.

English translation of German Office Action dated Mar. 28, 2006 involving German Application No. 10 2005 045 106.3-33 (co-pending application).

German Office Action dated Jan. 31, 2007 involving counterpart German Appliction No. 10 2005 058 877.8-42.

English translation of German Office Action dated Jan. 31, 2007 involving counterpart German Application No. 10 2005 058 877.8-42.

UK Search Report dated Feb. 16, 2005 involving UK Application No. GB0427259.7 (co-pending application).

Evident Technologies, Nanomaterials Catalog v5.0, Nanomaterial Products (Aug. 2004), pp. 1 - 12.

* cited by examiner

STUDIO LIGHT

CROSS REFERENCE TO RELATED APPLICATIONS

The present application is related to co-pending and commonly assigned U.S. patent application Ser. No. 10/742,310 filed Dec. 19, 2003, entitled "Flash Lighting for Image Acquisition," and to co-pending and commonly assigned U.S. patent application Ser. No. 10/799,126 filed Mar. 11, 2004, entitled "Light to PWM Converter," the disclosures of which are incorporated herein by reference.

TECHNICAL FIELD

Embodiments in accordance with the invention are related to lighting used in photography.

BACKGROUND

Lighting plays a vital role in photography, particularly in studio photography. For settings such as portraiture, it is common to use a number of studio lights to illuminate the subject and the backdrop. For a particular setting, the lighting may include a main light, providing the main lighting on the subject, one or more side or fill lights, filling in along the sides of the subject, and a back light illuminating the backdrop.

Commonly used studio lights comprise an incandescent lamp which provides steady illumination at a first, low intensity, and a flashtube, typically filled with Xenon gas or a combination of gases, which provides flash illumination at a second, much higher intensity but for a very brief period. The incandescent lamp in the studio light allows the photographer to position and adjust the lighting, while the flashtube provides high intensity illumination for recording the image. The flashtube in the studio light may be triggered from an electrical signal such as from a wire connection to a camera or other studio light, a wireless connection using radio frequency (RF) transmitters and receivers, or may be triggered in "slave" fashion by a photosensor on the studio light detecting another flash.

Such a system of studio lights allows the photographer to set the subject, position the studio lights, and then record images.

Proper color balance, or color temperature of lighting sources is very important in color photography. Flash sources commonly have equivalent color temperatures similar to daylight, on the order of 5200-5500 degrees Kelvin (K). Commonly used incandescent (tungsten) sources have color temperatures on the order of 3200K.

In the studio setting, the photographer must perform setup using incandescent illumination, while recording images using flash illumination; the color balances of the two are quite distinct. In some settings, such as those outside the studio, the photographer may have to deal with situations with strong ambient light from tungsten or fluorescent sources, or from sunlight or other strong illumination filtered through or reflected off colored objects. In these situations, the photographer may use filters to try and correct the illumination to provide a balanced image.

Based on the fixed spectra of presently available flashes and the limitations of filters used to modify spectral content of available light, there is a need for a studio light with adjustable color temperature.

SUMMARY OF THE INVENTION

A solid-state studio lighting system according to the present invention provides light from a solid-state source at a first intensity and equivalent color temperature, switching to a second, higher intensity for a short duration. The equivalent color temperature of the second, higher intensity illumination may be different from the first color temperature. The solid state-source comprises emitters in a plurality of colors.

DETAILED DESCRIPTION OF THE EMBODIMENTS

Figure 1:
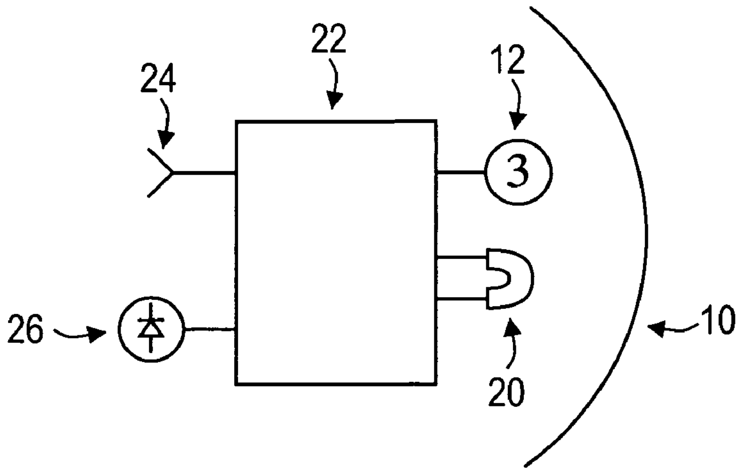
Figure 1 (Prior Art)
FIG. 1 shows a block diagram of a studio light known to the art.

FIG. 1 shows a block diagram of a studio light as known to the art. Reflector 10 reflects and diffuses light from incandescent source 12, and flash source 20. Flash electronics 22 provide the high voltage necessary to operate flash source 20, and include synchronization terminal 24, and flash sensor 26, typically a photodiode. Flash source 20 is typically a xenon flash lamp. Flash electronics 22 may provide selectable flash intensities, but the effective color temperature of flash source 20 remains constant, defined by the chemical composition of the gas in flash source 20.

During operation, incandescent source 12 provides illumination for adjusting and focusing lights. During image capture, flash source 20 is triggered through synchronization terminal 24 or flash sensor 26, and flash illumination is provided at a much higher intensity for a brief period, and with a color temperature set by the gas composition of the flash tube. The color temperature of the flash illumination may be changed with filters, but such filters are expensive, and change over time as they are repeatedly blasted by the flash source 20.

Figure 2:
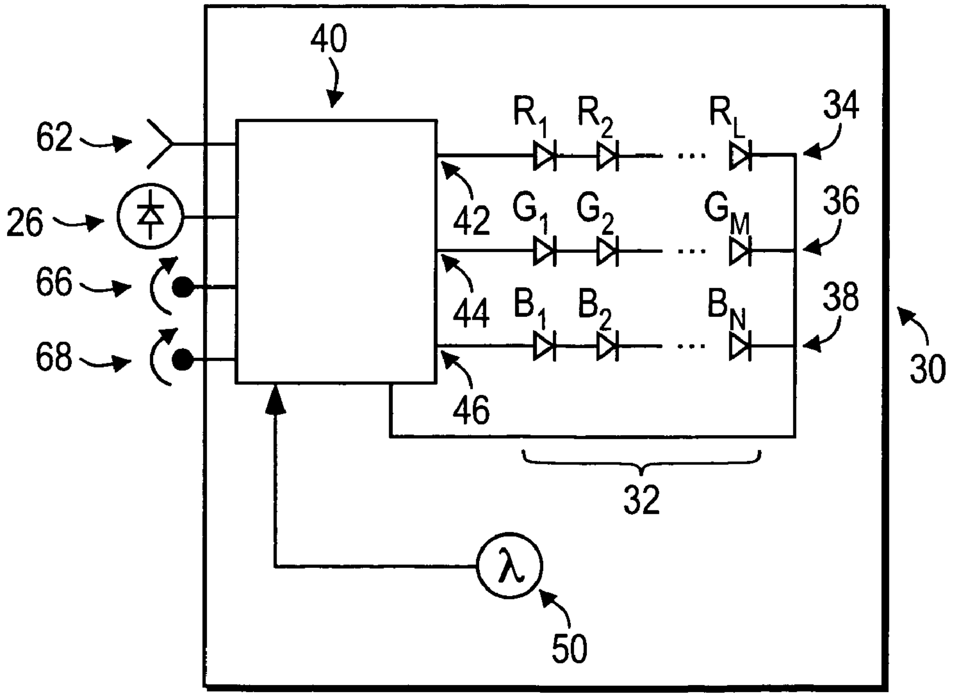
FIG. 2 shows an exemplary studio light according to an embodiment of the present invention.

FIG. 2 shows a block diagram of an studio light 30 according to an embodiment of the present invention. Studio light 30 includes light module 32 with a set of emitters of light of at least two different colors. In the embodiment of FIG. 2, the emitters are indicated as $R_1$-$R_L$ 34, $G_1$-$G_M$ 36, and $B_1$-$B_N$ 38. The subscripts L, M, N are integers that represent the number of red emitters, green emitters and blue emitters, respectively. The number of emitters of each color will be determined by the light output needed and the light output available from each individual emitter. While a series connection is shown, the emitters may be driven in parallel, or individually.

In the embodiment shown, red, green and blue light emitting diodes are used, although emitters of other colors are alternatively used to provide a sufficiently wide spectral content adjustment range. Driver 40 provides drive signals $S_R$ 42, $S_G$ 44, and $S_B$ 46 to these different color emitters $R_1$-$R_L$, $G_1$-$G_M$, $B_1$-$B_N$, respectively. By varying the drive signals corresponding to the different color emitters in the series, the spectral content of flash light provided by the light module 32, which is a mixture of the light provided by the different color emitters, can be correspondingly varied.

Color sensors 50 sense the color of the light emitted by light module 32. Typically, sensors 50 are CMOS detectors, photodiodes or other transducers that convert received light from light module 32 to electrical signals that can be processed by driver 40 to produce the desired color temperature. The color temperature required will be determined by the camera or imaging device used with studio light 30. Daylight imaging is balanced for bluish light having a color temperature of 5500 Kelvin for example. Alternatively, imagers such as film cameras using tungsten film are balanced for orange or warmer light having a color temperature of 3200 Kelvin for example.

Driver 40 has synchronization terminal 62, and optionally flash sensor 64, typically a photodiode. Also provided is first color temperature adjustment 66, and second color temperature adjustment 68. Optional adjustments may be provided for a first and second intensity level, or these intensity levels may be preset by driver 40.

In operation, driver 40 provides a first, low level of illumination at a first color temperature selected by first color temperature adjustment 66 by providing drive signals 42, 44, 46 to light module 32. In response to a flash signal, through synchronization terminal 62 or flash sensor 64, driver 40 switches light module 32 to a second, higher level of flash illumination selected at second color temperature adjustment 68 by providing drive signals 42, 44, 46 to light module 32. This second, higher level of flash illumination is provided for a brief period of time, typically on the order of milliseconds, after which driver 40 switches light module 32 back to the first, low level of illumination.

The adjustable spectral provided by light module 30 can provide color balancing to help to neutralize ambient lighting, or otherwise accommodate for an undesired color content or color temperature of the ambient light. The spectral content of the flash illumination provided by light module 30 can also be adjusted to achieve a desired photographic effect. For example, providing flash illumination that is cooler when the photographic is a dark-skinned human generally results in an acquired image wherein the skin appears to be lighter, whereas providing a warmer light to such a photographic subject results in an acquired image wherein the skin appears to be a richer tan color. In addition to these particular examples, a variety of image characteristics and effects can be achieved via adjustments of the spectral content of the flash illumination provided by color temperature adjustment 68.

In one embodiment, the emitters of the light module 32 are solid state light sources such as laser diodes or LEDs (light emitting diodes). In addition to using normal LEDs, phosphor-broadened LEDs using phosphor coatings known to the art which are excited by an LED may be used to produce wider spectral output. However, the set of emitters includes any other light sources of two or more different colors, or any suitable light source that has a spectral content that is adjustable. The emitters of different colored light in the light module 32 are independently accessible. In one example, the series of emitters $R_1$-$R_L$, $G_1$-$G_M$, $B_1$-$B_N$ includes an array of one or more red emitters $R_1$-$R_L$, such as red LEDs, one or more green emitters $G_1$-$G_M$, such as green LEDs, and one or more blue emitters $B_1$-$B_N$, such as blue LEDs. Red, green and blue are readily available LED colors and when the output light from these LEDs is mixed, the emitters $R_1$-$R_L$, $G_1$-$G_M$, $B_1$-$B_N$ provide adequate coverage of the color space for the resultant flash illumination.

The number and arrangement of emitters is determined to a great extent by the light output of the emitters included in the light module 32 and the needed intensity of the flash illumination. The emitters of each color may be intermixed, or may be grouped in designated color sections. Independent accessibility of the different color emitters $R_1$-$R_L$, $G_1$-$G_M$, $B_1$-$B_N$ enables the relative intensities of the different color emitters to be independently varied, which results in the spectral content or color temperature of the flash illumination provided by the light module 32 being varied.

The relative intensities of the light provided by each of the different color emitters is varied via corresponding variations in the drive signals 42, 44, 46 provided to each of the different color emitters $R_1$-$R_L$, $G_1$-$G_M$, $B_1$-$B_N$, respectively. In the example where the red emitters $R_1$-$R_L$ include one or more red LEDs, the green emitters $G_1$-$G_M$ include one or more green LEDs and the blue emitters $B_1$-$B_N$ include one or more blue LEDs, the drive signals 42, 44, 46 are typically currents provided to the LEDs and the relative intensities of the colored light output of the emitters $R_1$-$R_L$, $G_1$-$G_M$, $B_1$-$B_N$ is varied according to relative magnitudes of the currents that are supplied to activate the different color LEDs. For example, to provide flash illumination with increased blue intensity, current provided to the blue LEDs is increased relative to the current provided to the green LEDs and the current provided to the red LEDs. Similarly, flash illumination having different spectral content is provided by relative variations of the currents that are provided to the different color LEDs. To provide the drive signals 42, 44, 46, in this example, driver 40 varies the current to different color emitters in the light module 32. Driver 40 can include any other circuit, element or system suitable for modulating the relative intensities of the light provided by each of the different color emitters $R_1$-$R_L$, $G_1$-$G_M$, $B_1$-$B_N$. An example of a method and apparatus for controlling spectral content of different color emitters is provided in U.S. Pat. No. 6,448,550 B1 to Nishimura, and is hereby incorporated by reference. However, any other drive signals 42, 44, 46 or drive schemes suitable for varying the spectral content of the illumination provided by the light module 32 are alternatively included.

In the example where the different color emitters each include an array of light sources, such as LEDs, the relative intensities of the different color emitters are alternatively adjustable by corresponding adjustments in the number of light sources within the array that are activated. For example, to provide flash illumination with decreased blue intensity, current is provided to fewer blue LEDs than the green LEDs or red LEDs, and so on. Thus, in this example the spectral content of the flash illumination can be adjusted in discrete steps by using switches other suitable circuitry to vary the number of individual emitters of each color that are activated by the drive signals.

Typically, emitters $R_1$-$R_L$, $G_1$-$G_M$, $B_1$-$B_N$ included in the light module 32 have integrated lenses that establish the spatial distribution of illumination provided by light module 32. However, reflectors, lenses or other optical elements are optionally included externally to the emitters $R_1$-$R_L$, $G_1$-$G_M$, $B_1$-$B_N$ in the light module 32 to control the spatial distribution of the illumination produced.

While the embodiments of the present invention have been illustrated in detail, it should be apparent that modifications and adaptations to these embodiments may occur to one skilled in the art without departing from the scope of the present invention as set forth in the following claims.

The invention claimed is:

1. A photographic studio light module, comprising:

a plurality of light emitters having at least two different colors;

a driver circuit operably connected to the plurality of light emitters and configured to provide corresponding driving signals to each or groups of the plurality of light emitters;

a plurality of light sensors configured to sense a color temperature and an intensity of light emitted by the plurality of light emitters and provide electrical signals representative thereof to the driver circuit, the driver circuit further being configured to receive and process the electrical signals to determine the color temperature and intensity;

a flash synchronization circuit configured to receive an external flash input signal;

wherein the light module is configured to operate selectively between a first low-level illumination mode providing emitted light of a first color temperature and a first intensity and a second flash mode providing emitted light of a second color temperature, the light module further being configured to operate in the first low-level illumination mode until the external input flash signal is provided thereto whereupon the light module switches to the flash mode and provides a flash output illumination signal, the light module still further being configured to return to the low-level illumination mode after the output flash illumination signal has been provided thereby.

2. The photographic studio light module of claim 1, wherein the first color temperature is different from the second color temperature.

3. The photographic studio light module of claim 1, wherein the first color temperature is substantially the same as the second color temperature.

4. The photographic studio light module of claim 1, wherein the first intensity is less than the second intensity.

5. The photographic studio light module of claim 1, wherein the first and second color temperatures are adjustable.

6. The photographic studio light module of claim 1, wherein the first and second light intensities are adjustable.

7. The photographic studio light module of claim 1, wherein the external flash input signal is selected form the group consisting of an electrical signal, a wireless signal and a light signal.

8. The photographic studio light module of claim 1, wherein the plurality of light emitters further comprises light emitters of at least three different colors.

9. The photographic studio light module of claim 1, wherein the plurality of light emitters further comprises at least one red solid state light emitter, at least one green solid state light emitter and at least one blue solid state light emitter.

10. The photographic studio light module of claim 1, wherein the plurality of light emitters further comprises an array of at least one red solid state light emitter, an array of at least one green solid state light emitter and an array of at least one blue solid state light emitter.

11. The photographic studio light module of claim 1, wherein the plurality of light emitters further comprises at least one phosphor-broadened solid state LED.

12. The photographic studio light module of claim 1, wherein the driver circuit is configured to drive the plurality of light emitters at least one of serially, in parallel or individually.

13. The photographic studio light module of claim 1, wherein the first and second color temperatures of the light emitted by individual ones or arrays of the plurality of light emitters is adjustable in accordance with the driving signals provided thereto.

14. The photographic studio light module of claim 1, wherein the first and second intensities of the light emitted by individual ones or arrays of the plurality of light emitters is adjustable in accordance with the driving signals provided thereto.

15. The photographic studio light module of claim 1, further comprising at least one of a reflector, a lens and an optical element configured to control the spatial distribution of illumination provided by the light module.

* * * * *